UNITED STATES PATENT OFFICE.

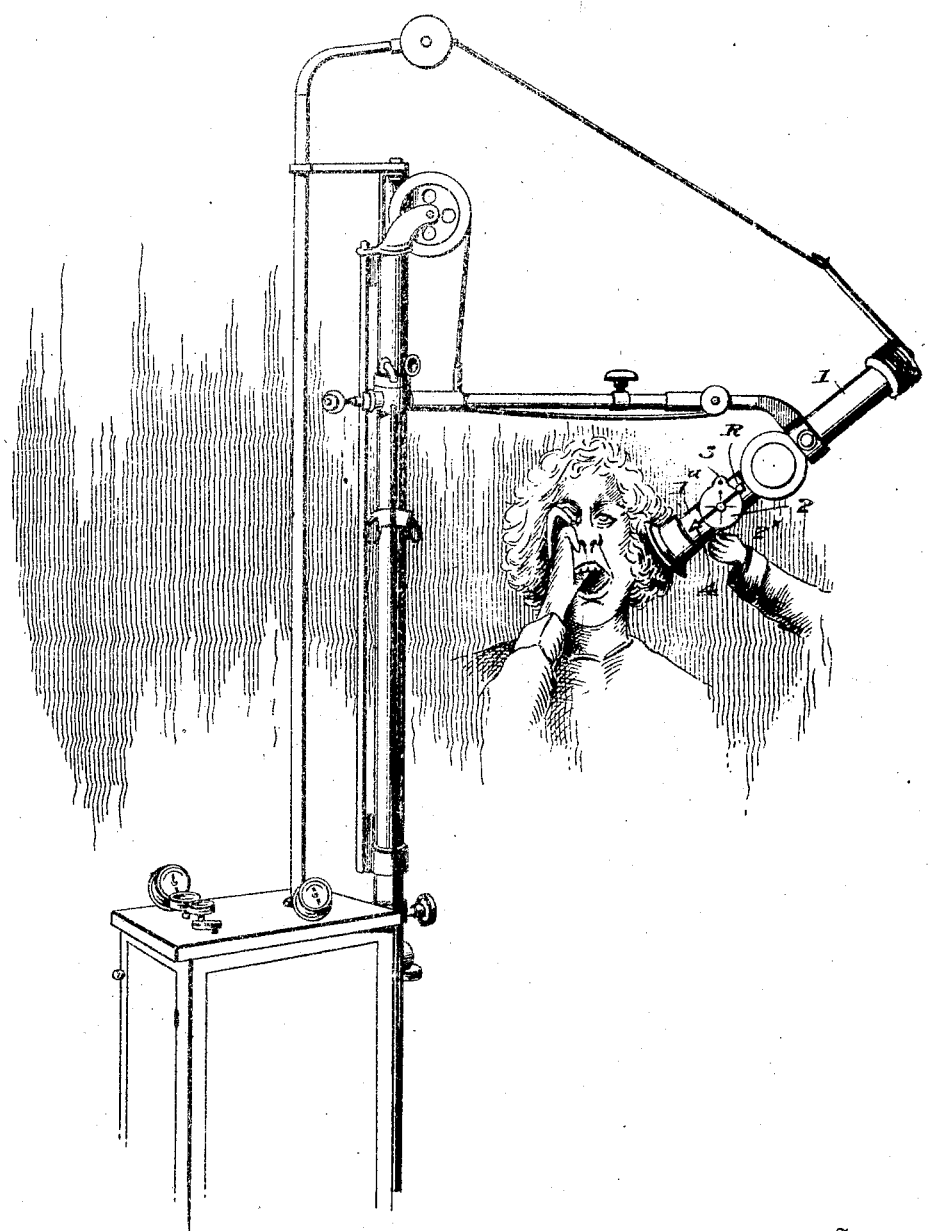

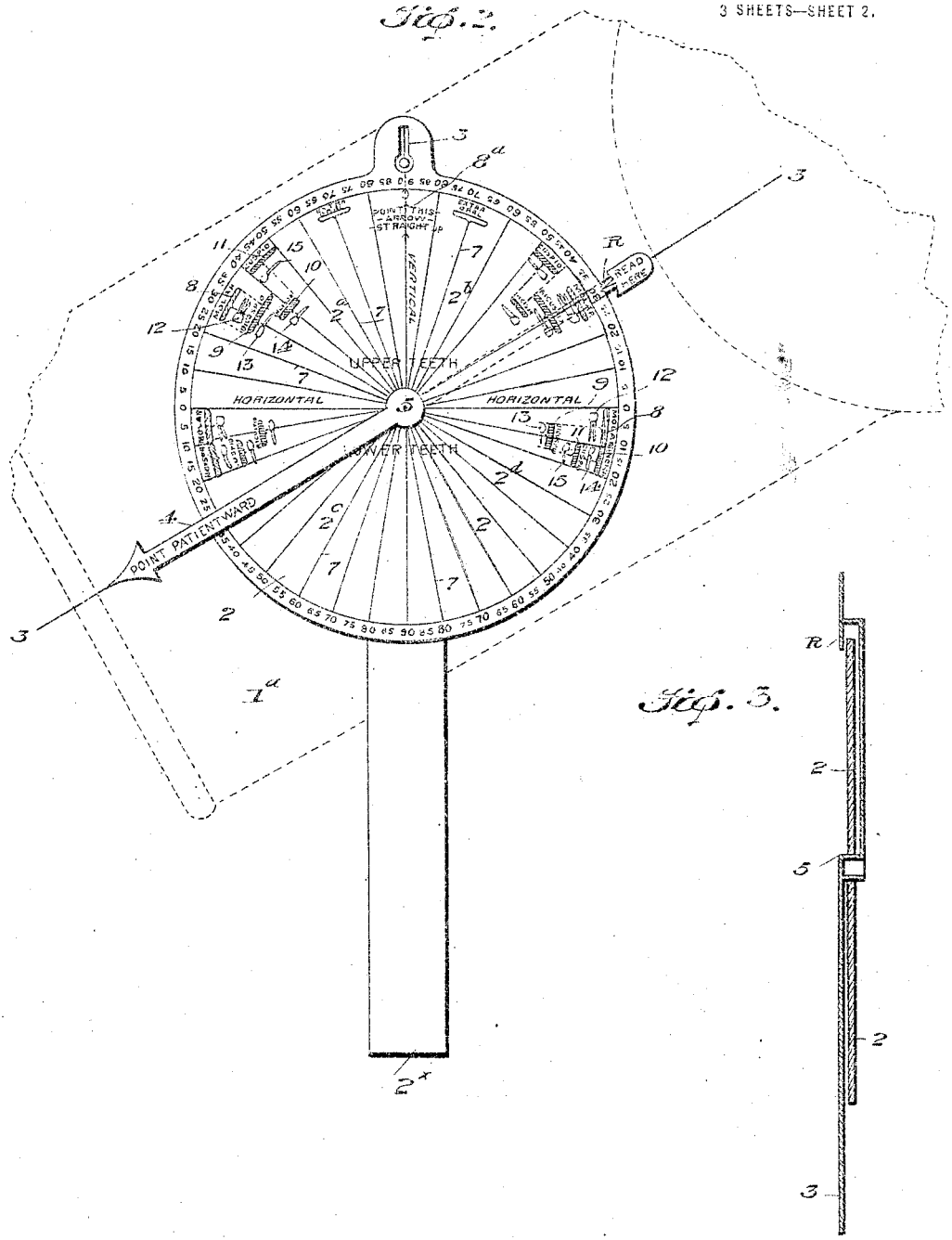

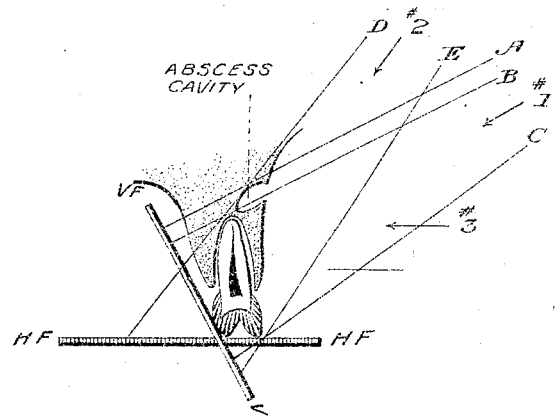
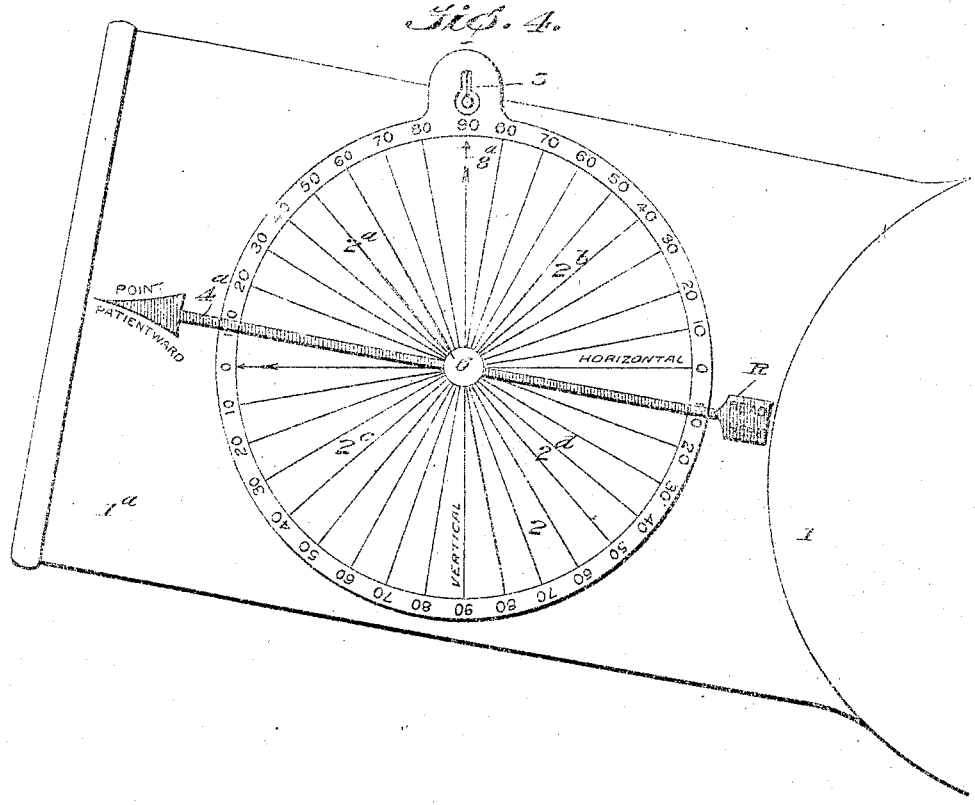

HOWARD RILEY RAPER, OF ALBUQUERQUE, NEW MEXICO.

X-RAY ANGLE INDICATOR.

1,408,777.   Specification of Letters Patent.   Patented Mar. 7, 1922.

Application filed January 3, 1921. Serial No. 434,774.

*To all whom it may concern:*

Be it known that I, HOWARD RILEY RAPER, a citizen of the United States, residing at Albuquerque, in the county of Bernalillo and State of New Mexico, have invented certain new and useful Improvements in X-Ray Angle Indicators, of which the following is a specification.

This invention relates to an X-ray angle indicator for use on X-ray machines to show the angle at which the X-ray tube is inclined to the horizontal, and is particularly adapted to inform the operator of the correct range of angles for inclining the X-ray tube in dental radiography, although useful in radiography of any part of the cranium and the body wherever it is necessary to incline the tube to a predetermined angle to obtain a desired result.

As my invention has particular usefulness in dental radiography, it is hereinafter described as adapted for that purpose; but it is to be understood that the specific disclosure and explanation in that connection is not to be deemed as restricting the application of the invention to that branch of radiography alone. It is to be understood, however, that one branch of the invention is specific to dental radiography, to-wit, the dial which I have invented, based on much research work and many experiments, which has angles and indicia by which the operator of the X-ray machine may accurately predetermine the angle to the horizontal at which the cone or tube of the machine should be set to obtain a radiograph of any particular tooth, whether molar, cuspid, bicuspid or incisor, and on either the upper or lower jaw, which will accurately disclose the conditions prevailing at that particular tooth and thus enable diagnoses, within reasonable limitations of accuracy, to be obtained.

In respect to the other branch of my invention, the combination of an angle indicating dial and a pointer, or a dial and plumb and pointer, and disregarding the special dental indicia, the invention has a wider range of usefulness than in dental radiography as it enables the X-ray tube to be properly inclined to make radiographs of the cranium and any desired part of the body.

The art of radiography involves the principle of casting shadows, to-wit, a source of light, an object, and a screen or surface on which the shadow falls. In dental X-ray work, the X-ray tube corresponds to the source of light, the tooth and the contiguous parts to the object, and the surface of the film to the screen on which the shadow is cast.

Depending on the relationship existing between the light, the object and the surface, a shadow may assume the true form of the object, or, it may assume a fantastic, distorted form thereof. It therefore becomes necessary in order to obtain a true shadow, to establish a correct relationship between the light, the object and the surface.

In dental radiography the teeth and contiguous parts and the film are not subject to extreme variation of position. The difficulty of obtaining radiographs which truly disclose the condition of a given tooth and contiguous parts is to properly locate and incline the X-ray tube. If the head of the patient is placed so that the roots of the teeth are substantially vertical and the film is placed in the mouth so that it presses against the tissues close to the teeth, two of the material factors have been taken care of. The third factor is the adjustment of the X-ray tube in correct position to obtain the correct radiographic image.

Heretofore the operator of the X-ray machine has depended solely upon judgment or natural aptitude or intuition for the proper angular arrangement of the tube to meet any given condition and object as to whether a true or distorted radiograph is desired. For, it will be understood, that distortion, i. e., elongation of the picture to a moderate degree, sometimes affords a better view of certain disease conditions than a true picture would disclose and which foreshortening would completely obscure. Some operators obtain a picture of the ends of the roots at the expense of good reproduction of the balance of the teeth, while others obtain good pictures of the teeth and yet appear unable to catch the end of the root on the film. Other operators appear unable to approximate the proper angle for any given tooth.

From the foregoing, and a wide variety of other causes, dental radiography has not heretofore insured inclusion in the radiograph of all conditions prevailing at the tooth or teeth receiving attention.

My invention accomplishes two purposes: First, it discloses the exact angle to the horizontal at which the X-ray tube is set, whether it be inclined upwardly or downwardly; and second, it furnishes instant information to the dental radiographer of the ranges or limits of angles of any given tooth, whether molar, cuspid, bicuspid or incisor on either the upper or lower jaw, if an accurate representation of conditions is to be obtained. The invention therefore leaves little to the judgment or intuition or "sense" of position on the part of the operator, and saves time, effort, and expense in this class of work.

I am aware that my invention may be embodied in other forms than those hereinafter described and which are shown in the accompanying drawings. And, further, that the angle markings and indicia of the dial which comprise an invention aside from the use of a pointer and a plumb, may be employed on a portable or hand-carried indicator instead of being attached to the X-ray machine.

The disclosure of the invention hereinafter given is, therefore, to be considered as illustrative of the invention and not in limitation of the scope thereof or the utilization of the essential principles involved.

In my application, Serial No. 434,775 filed Jan. 3, 1921, I have disclosed other forms the invention may assume; but this, also, is not to be considered in limitation of the invention.

In the accompanying drawings:—

Figure 1 is a view showing the manner in which a portable embodiment of the invention is used to determine the angle of inclination of the tube of an X-ray apparatus;

Fig. 2 is a detail view of the same form of the invention as shown in Fig. 1, the X-ray tube and cone or cylinder being shown in dotted lines;

Fig. 3 is a detail section on line 3—3, Fig. 2;

Fig. 4 is a side elevation of an embodiment of the invention wherein the dial is rotatably mounted on the side of the X-ray tube, cone or cylinder having a fixed pointer or indicator; and Fig. 5 is a diagram of an upper bicuspid and two films, illustrating the necessity for inclination of the X-ray tube at the proper angle.

In Fig. 1 I have shown certain parts of an X-ray apparatus which is provided with the X-ray tube 1. My invention may be portable, or, carried by the bottom, side, or top of the cone $1^a$ of the tube. In the particular embodiment of the invention illustrated in Figs. 1, 2, 3 of the drawings, the angle indicator is in the form of a portable device which is held in the operator's hand. It may, however, be attached to the cone in any desired or preferred manner, as shown, for instance, in Fig. 4.

A dial 2 carries indicia which is the result of numerous experiments and much research work on my part. When the invention is embodied in portable form, as disclosed in Figs. 1, 2, 3, the dial 2 may be provided with a handle $2^x$ which is grasped by the operator. The dial may, however, be carried by a supporting stand, or by a bracket on the X-ray apparatus. The dial 2, when rotatably mounted on the cone $1^a$, as shown in Fig. 4, is, in effect, a part of the X-ray tube and is adapted to be moved up and down, or laterally, with said tube.

In any embodiment of the invention the dial may be either opaque or transparent. Carried by the dial is a dangling plumb 3. Referring to Figs. 1, 2, 3, in this form a settable pointer 4 is pivoted centrally of the dial, as at 5. The pointer may be of some distinctive color, if desired. The settable pointer 4 is frictionally held at the pivot 5 to a degree sufficient to maintain it in any position to which it may be swung.

Referring to Fig. 4, the dial 2 is shown pivotally mounted at 6 on the side of the cone $1^a$ in any suitable manner so that said dial is bodily carried by the cone. The cone $1^a$ is provided with a stationary pointer or arrow $4^a$.

In both forms of the invention heretofore described, the reading is taken at R.

By research and experiment I have discovered that there are certain ranges or limits of angular disposition of the X-ray tube within which the operator must keep when radiographing molars, bicuspids, incisors and cuspids on the upper jaw and that entirely different ranges of angles must be observed when taking X-ray pictures of molars, bicuspids, incisors and cuspids on the lower jaw. These angles are as follows:

*Upper teeth.*

Upper incisors, from 35° to 45° above the horizontal.

Cuspids, from 40° to 50° above the horizontal.

Bicuspids, from 25° to 40° above the horizontal.

Molars, from 25° to 35° above the horizontal.

*Lower teeth.*

Incisors and cuspids, from 10° to 20° below the horizontal.

Lower bicuspids, from 5° to 15° below the horizontal.

Lower molars, from 0° (i. e. the horizontal) to 10° below the horizontal.

Failure to obtain accurate and complete radiographs will result if these limits are not observed. Undoubtedly the failure of operators to obtain proper radiographs of any given tooth has been the result of lack of knowledge of the proper angle (within a given range) at which the X-ray tube should be inclined. So far as I am aware, I am the first to invent means, in the form of a chart, dial, or other disclosure, which presents this information to the radiographer, whether in the form of a dial or chart alone, or a dial or chart used in connection with an indicating device which automatically, so to speak, discloses the fact that the tube is at the proper angle for the taking of a radiograph of a particular tooth.

Radiating from the center of the dial on the quadrants 2ª and 2ᵇ, respectively, are lines 7, 7, indicating the different angles, each line being provided with the angle designation, as 10, 20, 30, etc.

The word "molar" is provided on the dial between the angles representing the limits of inclination of the tube 1 for X-raying a molar. For instance, on the quadrant 2ª the word "molar" runs from the angle line 25 to the angle line 35 for upper teeth. Similarly, as the proper range of angular disposition for bicuspids is between 25° and 40° for upper teeth, the word "bicuspids" is provided and comprehended between the angle lines 25 and 40 on the quadrant 2ª. The word "incisors" appears between the angle lines 35 and 45 for upper teeth. The word "cuspids" appears between the angle lines 40 and 50 for upper teeth on quadrant 2ª.

To further assist the operator colors may be employed in the form of markings corresponding to the ranges between angles. For instance, a red band 8 represents the range of angles for molars; a green band 9, the range for bicuspids; a yellow band 10, the range for incisors; and a blue band 11, the range for cuspids.

As a further aid to the operator, pictures of the different teeth may be provided as shown at 12, 13, 14, 15.

The same plan of indication and identification heretofore described for the quadrants 2ª, 2ᵇ is carried out on the quadrants 2ᶜ, 2ᵈ which represent angles for lower teeth. Here the molars are represented as between 0 and 10. The bicuspids as between 5 and 15; the incisors and cuspids as between 10 and 20. The same color markings as above described, for instance, a red band 8 represents the range for molars; a green band 9, the range for bicuspids; a yellow band 10, the range for incisors and a blue band 11 cuspids.

Certain conditions are met with in X-ray dental work where there is a malformation or tipping of the teeth. The dial 2 may be provided with indicia representing proper angles at which the tube 1 should be set to meet such conditions, if desired, although is not shown.

have ascertained by research that the following angles for the tube 1 should be observed:

Lower molars tipped away to the lingual: 10° above the horizontal.

For extra-oral lateral dental radiographs: 65° to 75° above the horizontal.

Upper teeth with the film placed horizontally in the mouth: about 60° above the horizontal.

Upper molars when the vault is very high: as low as 20°.

If these angles are observed, about 90% of cases will be properly radiographed; but in extreme malposition of teeth, extreme angles are required.

The angles hereinbefore given are based on the assumption that the patient's head will be so placed that the teeth will be disposed substantially vertically.

My invention has to do, more particularly, with the inclination of the X-ray tube for vertical angles. The invention does not lend itself very well to the determination of horizontal angles, but as successful dental radiography depends largely on the correct determination of vertical angles, the invention provides means for insuring successful radiographs in a very high percentage of cases.

Assuming, by way of illustration, that an upper molar is to be radiographed and that 30° (midway between the limits 25° and 30°) is the angle to which the tube 1 is to be set, this indication appearing on the quadrant 2ᵇ where the word "molar" and the red band 8 appear, the operator immediately moves the pointer 4 to the 30° point as shown at R. Knowing the particular tooth which is to be radiographed, the operator's eye naturally sets pointer at R to the word, color and tooth representation on the dial 2. In the example mentioned the pointer 4 having first been set to the 30° mark, and the device positioned alongside the cone 1ª with the plumb 3 lined up with the vertical line having the arrow 8ª, and the pointer 4 pointing toward the patient, as shown in Figs. 1 and 2, the tube 1 is tilted downwardly until the pointer 4 aligns with the longitudinal axis of tube 1 or cone 1ª. It is then known that the tube is at the proper degree of inclination. Assuming that a lower bicuspid is to be radiographed by using the form of the invention shown in Fig. 4, where the dial 2 is revolubly mounted on the side of the cone 1ª the dial is turned until the pointer 4ª aligns with the 10° mark at R; the operator then tilts the tube 1 until the plumb 3 aligns with the vertical line and arrow 8, whereupon the tube is at the proper angle to radiograph the tooth.

According to whether the tooth to be radiographed is on the upper or lower jaw, the tube 1 must be tilted downwardly or upwardly and brought to the proper predetermined angle, as the case may be.

Fig. 5 illustrates how it is possible to "miss" an abscess at the root of an upper bicuspid if the X-ray tube is inclined at too great an angle whereas the abcess will show if the tube is inclined at the correct angle.

VF, is a film placed in a more or less vertical position in the mouth. HF, is a film placed horizontally in the mouth. The abcess cavity will register between lines A and B when the X-rays are directed through the parts as indicated by arrow No. 1. But the abscess cavity will not show when the X-rays are directed through the parts as indicated by arrow No. 2. The placing of the film in the mouth horizontally (HF) necessitates the use of the high-above angle of the rays (arrow No. 2). Therefore, the placing of the film in the mouth in this position is contra-indicated when one wishes to make a careful examination for periapical infection.

What I claim is:

1. An angle indicating chart or dial for use in connection with X-ray machines, having angle indications and teeth identifying indicia associated therewith showing the correct range of angles for inclination of the X-ray tube for any tooth.

2. An angle indicating chart for use in connection with X-ray machines, comprising a disk or dial subdivided into upper and lower sections, each having angle indications and teeth identifying indicia showing the correct range of angles for inclination of the X-ray tube for any tooth, one of said sections showing the correct range of angles for radiographing lower teeth and the other section showing the correct range of angles for radiographing upper teeth.

3. An angle indicating chart for use in connection with X-ray machines, said chart being in the form of a disk having diameters representing vertical and horizontal positions and being sub-divided into quadrants, each quadrant having angle indications and teeth identifying indicia showing the correct range of angles for inclination of the X-ray tube.

4. An X-ray angle indicator for use in connection with X-ray machines, comprising a chart or dial having angle indications and teeth identifying indicia showing the correct range of angles for inclination of the X-ray tube for any tooth, and an indicating device adapted to point out angles thereon.

5. An X-ray angle indicator for use in connection with X-ray machines, comprising a chart having angle indications and teeth identifying indicia showing the correct range of angles for inclination of the X-ray tube for any tooth, a plumb arranged to co-operate with said chart, and an indicator to indicate the angles on said chart.

6. The combination with the X-ray tube of an X-ray machine, of a pivotally mounted angle indicating chart having angle indications and teeth identifying indicia showing the correct range of angles for inclination of the X-ray tube for any tooth.

7. The combination with the X-ray tube of an X-ray machine, of a pivotally mounted angle indicating chart having angle indications and teeth identifying indicia showing the correct range of angles for inclination of the X-ray tube for any tooth, and an indicating device adapted to point out on the chart any angle represented thereon.

8. An X-ray angle indicator for use in connection with X-ray machines, comprising a chart having angle indications and teeth identifying indicia showing the correct range of angles for inclination of the X-ray tube for any tooth, an indicating device which is movable in relation to the chart and is adapted to point out angles thereon, a settable pointer adapted to be moved to any angle position of said chart, and a plumb cooperating with the chart and with which the pointer may be brought into alignment.

In testimony whereof I affix my signature

HOWARD RILEY RAPER.